United States Patent
Armstrong

(10) Patent No.: US 7,654,387 B2
(45) Date of Patent: Feb. 2, 2010

(54) PIPE CONVEYOR

(76) Inventor: Gavin Campbell Armstrong, 48 Carrington Road, Kimberley (ZA) 8301

( * ) Notice: Subject to any disclaimer, the term of this patent is extended or adjusted under 35 U.S.C. 154(b) by 227 days.

(21) Appl. No.: 11/746,196

(22) Filed: May 9, 2007

(65) Prior Publication Data

US 2007/0261942 A1 Nov. 15, 2007

(30) Foreign Application Priority Data

May 9, 2006 (ZA) .............................. 2006/03646
Mar. 13, 2007 (ZA) .............................. 2007/02111

(51) Int. Cl.
*B65G 15/00* (2006.01)
(52) U.S. Cl. .................. 198/836.1; 198/860.1
(58) Field of Classification Search ............ 198/860.3, 198/818, 823, 836.1, 837, 860.5, 497, 819, 198/632, 861.3, 861.1, 820, 821, 831, 841, 198/494, 824, 835, 836.2, 785, 836.3, 633, 198/636, 700, 804, 809, 838, 839, 860.1; 193/37, 35 R See application file for complete search history.

(56) References Cited

U.S. PATENT DOCUMENTS

| | | | | |
|---|---|---|---|---|
| 3,212,628 A | * | 10/1965 | Massey et al. ............... | 198/311 |
| 3,311,221 A | * | 3/1967 | Mickelson et al. ........... | 198/816 |
| 4,170,293 A | * | 10/1979 | Campbell ................ | 198/860.4 |
| 4,402,390 A | * | 9/1983 | Feeney ........................ | 193/37 |
| 5,042,646 A | * | 8/1991 | Beatty ........................ | 198/819 |
| 5,052,545 A | | 10/1991 | Gongen | |
| 5,637,349 A | * | 6/1997 | Cummins et al. ........... | 427/212 |
| 5,645,157 A | * | 7/1997 | Kitano et al. ................ | 198/811 |
| 5,662,210 A | * | 9/1997 | Toews ......................... | 198/632 |
| 5,727,918 A | * | 3/1998 | Arend et al. ............. | 414/140.4 |
| 5,735,386 A | | 4/1998 | Epp et al. | |
| 6,068,103 A | * | 5/2000 | Werner ........................ | 198/311 |
| 6,131,725 A | * | 10/2000 | Saito et al. ................ | 198/690.2 |
| 6,170,644 B1 | * | 1/2001 | Nakaegawa et al. ......... | 198/811 |
| 6,195,908 B1 | * | 3/2001 | Crul ............................ | 34/343 |
| 6,273,244 B1 | * | 8/2001 | Dingeldein et al. ......... | 198/824 |
| 6,286,659 B1 | * | 9/2001 | Petrovic ...................... | 198/780 |
| 6,341,930 B1 | * | 1/2002 | Homer, III .................. | 414/327 |
| 6,360,878 B1 | * | 3/2002 | Deal et al. ................... | 198/819 |
| 6,405,855 B1 | | 6/2002 | Peltier et al. | |
| 6,422,381 B1 | | 7/2002 | Eberlc et al. | |
| 6,575,292 B2 | * | 6/2003 | Swinderman ............... | 198/499 |
| 6,675,958 B2 | | 1/2004 | Kaeb et al. | |
| 6,681,921 B1 | * | 1/2004 | Schroeder ................... | 198/818 |

(Continued)

OTHER PUBLICATIONS

Republic of South Africa, Official Publication No. 2002/0644 in the name of Gavin Campbell Armstrong entitled Diamond Recovery, Jan. 24, 2002, 16 sheets.

*Primary Examiner*—Gene Crawford
*Assistant Examiner*—William R Harp
(74) *Attorney, Agent, or Firm*—Banner & Witcoff, Ltd

(57) ABSTRACT

A conveyor for use in a conveying plant for recovery of diamond and other precious stones, semi-precious stones and minerals, and for conveying any material includes an endless conveyor with both its feed and return portions enclosed in a pipe, with a drive for driving the belt and a return idler, with the feed portion above the return portion and the feed portion cupped by the pipe, the pipe preferably being of plastic material and supported by a steel half pipe under the plastic pipe.

9 Claims, 7 Drawing Sheets

U.S. PATENT DOCUMENTS

| | | | |
|---|---|---|---|
| 7,000,758 B2 * | 2/2006 | Bjorklund | 198/716 |
| 2001/0023815 A1 * | 9/2001 | Mott | 198/617 |
| 2005/0000782 A1 * | 1/2005 | McDaniel | 198/824 |
| 2005/0217973 A1 * | 10/2005 | Bjorklund | 198/369.3 |

* cited by examiner

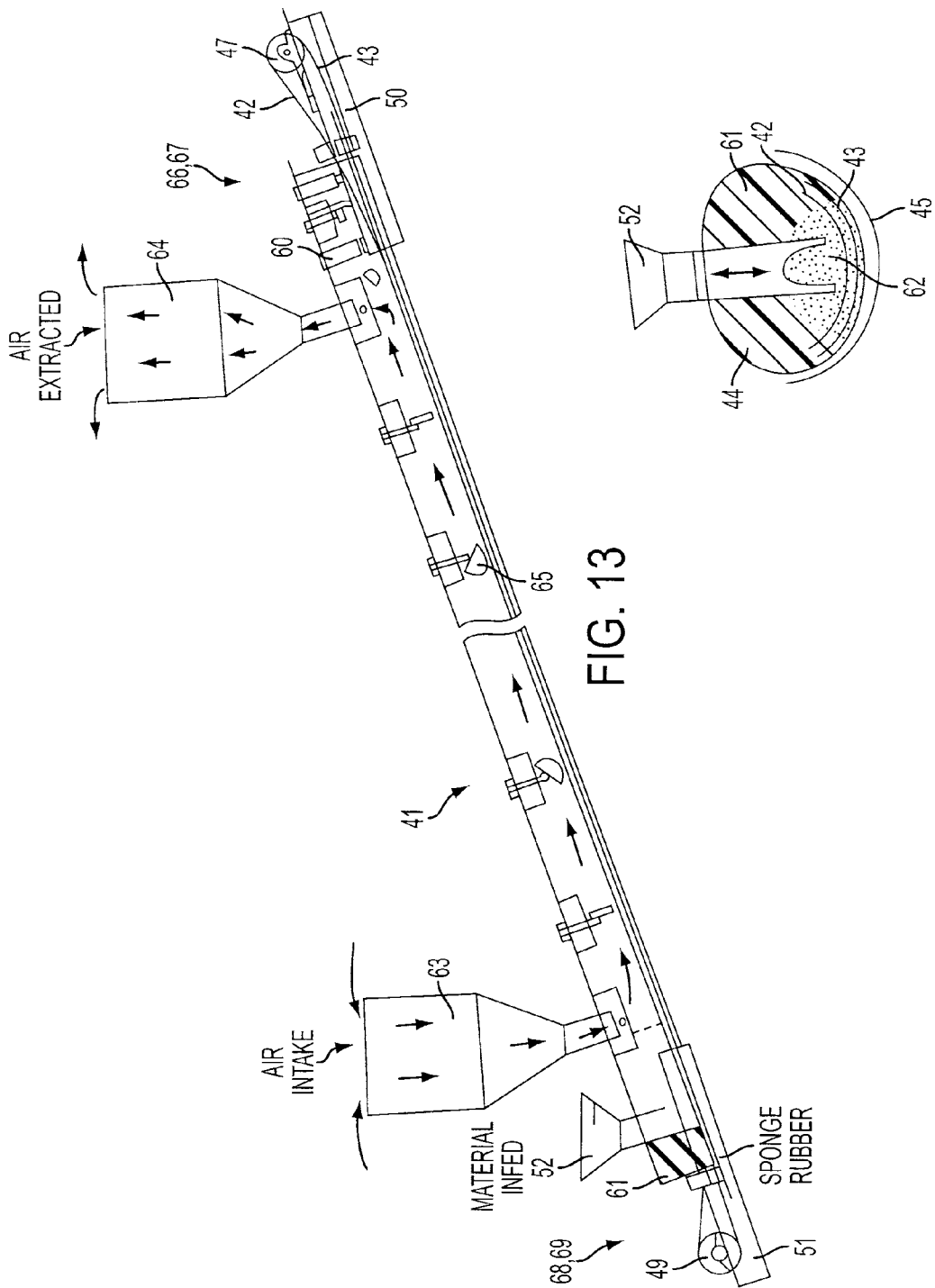

PIPE CONVEYOR

FIELD OF THE INVENTION

The application of this invention lies in many fields of conveying and processing materials, it is generally applicable in any application that requires transport or conveying of material. One application is in the field of diamond recovery by the process of diamond gravel sorting. The invention is favourably applicable, for example, in loading ships, conveying material in factories and industrial process plants. Apart from mineral beneficiation and industrial conveying the invention can be applied in the food industry, as an example of its versatility.

BACKGROUND OF THE INVENTION

Conveyor belts that have the feed portion of the belt located inside a pipe are described in U.S. Pat. No. 5,052,545, in the applicant's earlier South African patent 2002/00644 and in U.S. Pat. Nos. 5,735,386, 6,405,855, 6,422,381 and 6,675,958.

The applicant's patent 2002/00644 dealt primarily with diamond recovery where the conveyor belt feed being located inside a pipe improved security by enclosing the diamond-bearing gravel, with its return portion located below, as in the above cited US patents. The pipe has a hinge at an intermediate position of its length, capable of hinging the pipe into a reduced length, for transport to remote sites, with the belt still in the pipe. Idler rollers are provided at intervals to support the belt on its return stretch. The drive roller, return idler and idler roller supports are mounted on the pipe so that assembly of these items on site and set up is not required, so that maintenance is simplified. A key difficulty with this apparatus, however, is that a new belt cannot be installed in the pipe except by threading it through the pipe and then on site joining the ends to form a closed loop; a factory formed joint is not an available option. From practical experience of working in conditions where the material is damp or wet it adheres to the belt and causes spillage; this requires the belt to be scraped clean and belt scrapers do not function well with the type of belt joint that is possible on site, they become damaged or ineffectual and/or damage the belt at the joint.

SUMMARY OF THE INVENTION

The present invention provides an improved conveying apparatus, the apparatus including an endless conveyor belt with both its feed and return portions enclosed in a pipe, with at one end a drive roller for driving the belt and at the other end an idler roller, with the feed portion above the return portion and the feed portion cupped by the pipe.

An option that is possible is to provide the idler roller with a drive as well.

The term "cupped" refers to the edges of the feed portion of the belt being lifted up so that the belt assumes a trough shape, the better to hold the material; the belt is cupped by the pipe as the belt is wider than the pipe in the position where it is located above the return portion of the belt. Preferably the drive roller and the idler roller are located at elevated positions selected so that the feed portion of the belt at the top of the roller is located above the level of the diameter of the pipe. The elevated level is also selected so that the roller is less exposed to foreign material at ground level and is more accessible for adjustment, maintenance and replacement.

This arrangement allows a belt to be made up in the factory to a required length, with a high quality vulcanised joint or splice and inserted into the pipe, likewise it can be removed for replacement by simply pulling the belt loop out of the pipe. Spare factory-made belts may be kept on site to allow quick replacement in the case of belt failure thus maintaining optimum production.

In accordance with a preferred embodiment of the invention the pipe is made of a plastic material or other material of low coefficient of friction, the pipe supported by lying in a semi-pipe or trough of steel.

The semi-pipe of steel may be a hemi-pipe, that is a pipe slit along its length on its diameter, however, the pipe may be a semi-pipe slit along its length at position resulting in less than the diameter or more than the diameter, the latter case to embrace the plastic pipe more fully.

Preferably the plastic pipe is given a precise fit in the steel half-round pipe or hemi-pipe, this can be done by suitable selection of the outer diameter of the plastic pipe and the inner diameter of the steel pipe. In accordance with a preferred embodiment of the invention the close fit is provided by partially splitting the half round steel pipe centrally along its length so that it can be bent to suit the diameter of the plastic pipe, held in this position by clamping, spot welded along the length of the partial split. The plastic pipe is then removed and the split is welded along its length to give a near perfect plastic pipe to steel pipe fit.

The plastic may be a poly vinyl chloride (PVC), polyethylene (PE) material or a high density polyethylene (HDPE), just to name three possible materials, any other plastic selected to optimise performance may be used.

Using plastic pipes instead of steel pipes, benefits from the low coefficient of friction, for example $\mu=0.4$ rather than $\mu=1.4$; the lower friction provides a lower energy requirement which is important in remote sites and lower heat. The plastic pipe also has a lower weight than a steel pipe, due to the lower density of plastic than steel; this results in a weight saving of up to 40%.

The plastic pipe has the further advantage of being rust free which is important at sea or coastal conditions while the half round steel pipe can easily be galvanised or powder coated which is difficult in the case of a complete pipe of any appreciable length. However, use in the sun shows that unsupported plastic pipes sagged, leading to difficulties as the plastic pipe had not enough rigidity to support itself over any appreciable length. It will be appreciated that the plastic pipe weight, the belt weight and the load weight must all be supported.

In accordance with a preferred embodiment of the invention, the belt surface is ground to an accurate thickness dimension in situ on the apparatus; this is done by means of a grinding roller being mounted adjacent the driving roller or the idler roller, adjusted to a required position and rotated so as to grind off high spots of the belt as the belt is driven. Once the belt is accurate the grinding roller may be removed. Even factory produced high quality belts have increased thickness at the joint, this causes difficulty with belt scrapers, grinding the belt in situ creates a highly accurate belt surface for scraping and trouble-free belt scraping becomes possible.

Preferably the apparatus has a belt scraper added to it. The grinding of the belt may be adopted even for a belt that has been spliced in the field, if necessary.

A right cylindrical (straight profile) of the drive roller is preferred with two peripheral flanges to prevent material spillage where the belt flattens out on going over the pulley. The drive roller is the one which places the feed portion of the belt in tension in the pipe, the drive roller is preferably given a rubberised surface to increase the grip between the belt and the pulley and reduce or prevent slippage. The two peripheral flanges can be bolted each in two halves onto the pulley.

Preferably two guide roll sets are provided at each of the two ends of the pipe, where the belt exits and enters the pipe, positioned so as to guide the edges of the belt so that they do not abrade the ends of the pipe. The roll sets are mounted on the pipe ends with axes of rotation upright (that is, at ninety degrees to the axes of rotation of the drive and idler rollers, which are horizontal). Each roll set comprises two rolls that are positioned to roll against the edges of the feed and return portions of the belt.

The drive and idler rollers are adjusted in the known way by shifting the left and right plummer blocks or other bearing mountings longitudinally for correct tracking of the belt on the rollers. The two flanges, together with the guide roll sets and the pipe itself help to retain the belt in a central position which once set up needs very little or no further adjustment.

The two split flanges of steel or any suitable plastic material are bolted to the sides of the drive pulley so as to prevent spillage of conveyed material as the belt assumes a horizontal flat form as it exits from the pipe from a half round form that it has inside the pipe.

The driving roller and/or the idler roller can be made with a convex profile or camber to ensure self-centering of the tracking of the belt on the roller. The drive roller may be given a rubberized surface and a larger diameter (which increases contact area) to provide better transfer of the drive force from the roller to the belt and less slip for a given belt tension.

Thus the present invention provides a procedure for effective belt scraping on any conveyor belt of first grinding the belt to an accurate thickness over it full length by applying a roller grinder to the belt at a drive roller or idler roller, adjusted to grind a consistent thickness while driving the belt, then applying a belt scraper to the belt.

The belt scraper may be of less complex type than is often required, because of the enhancement of the belt by the process described, of grinding the belt to an accurate thickness in situ. The belt may be of the type having multiple contiguous scraping elements, each spring loaded and adjustable.

With both the feed and return portions of the belt being located inside the pipe transport and handling is less likely to cause damage, the belt can be pulled out of the pipe beforehand.

In accordance with a preferred embodiment of the invention there is provided a dolly consisting of a frame and road wheels (or cross-country wheels) with clamps for clamping to one or more pipes of the apparatus according to the invention, together with a tow hitch also adapted for connexion to the pipes, for towing them behind a tow vehicle. This makes the overland transport highly practical and economic in suitable circumstances.

Particularly long pipes can be manufactured so that they can be reduced in length for transport, e.g. by folding as described in the applicant's patent referred to above or by being split by disconnecting a joint intermediate of the operational length of the pipe; e.g. a bolted flanged joint. This allows a reduction of the pipe length to one suitable for more convenient and cost effective transport, while at the same time allowing quick set up of the plant at a site, for use. The quick set up is enabled because when the pipe is hinged out to its full operative length, the belt is already in the pipe and on the idlers, drive and return idler. So the usually demanding task of aligning the drive roller and return idler and other idlers is obviated. The pipe confers security against theft from the material being conveyed.

Preferably the drive is bolted to the pipe in a way that allows its removal, so that if required it can be removed, e.g. for transport, should his make handling and loading easier.

Preferably similarly, the return idler is bolted to the pipe in a way that allows its removal.

A feeder trough can be added to the plant, adapted for conveying (e.g. diamondiferous gravel) to the feed end of the conveyor, i.e. at the return idler end.

A delivery chute can be provided as well, and other components as may be required or desired for various applications.

BRIEF DESCRIPTION OF THE DRAWINGS

The invention will be more fully described by way of example, with reference to the accompanying drawings, in which:

FIG. 13 is a side view of a conveyor according to the invention with provision for drying, FIG. 14 is a cross sectional view of the feed bin and pipe conveyor shown in FIG. 13.

DETAILED DESCRIPTION

Figure 1:
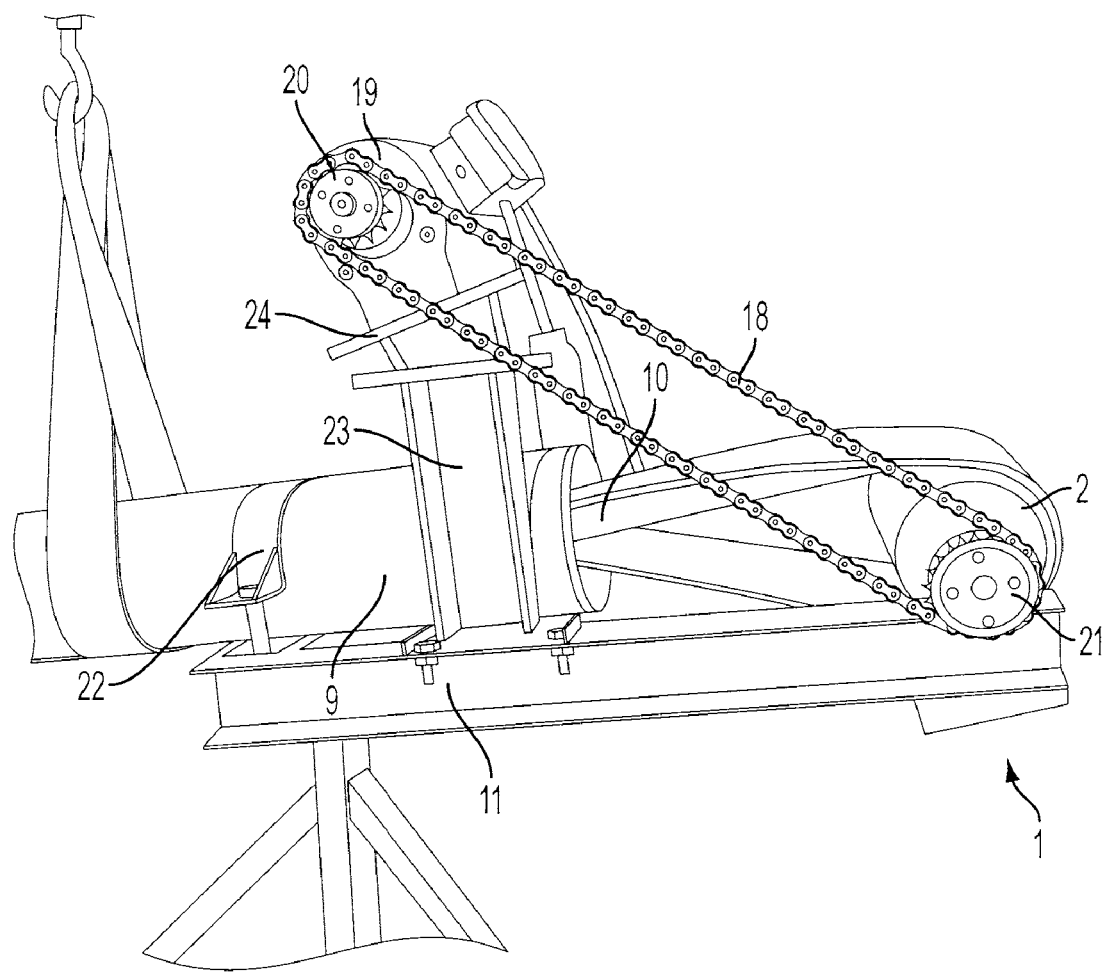
FIG. 1 is a side perspective view of the delivery end of a conveying apparatus.
Figure 2:
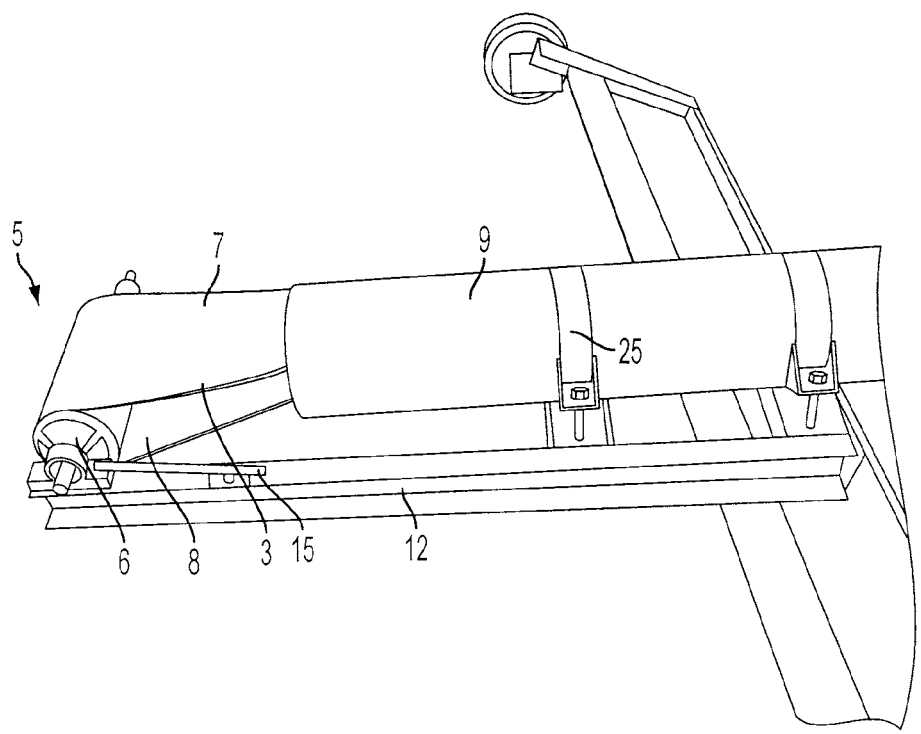
FIG. 2 is a perspective view of the in-feed end of the conveying apparatus.
Figure 3:
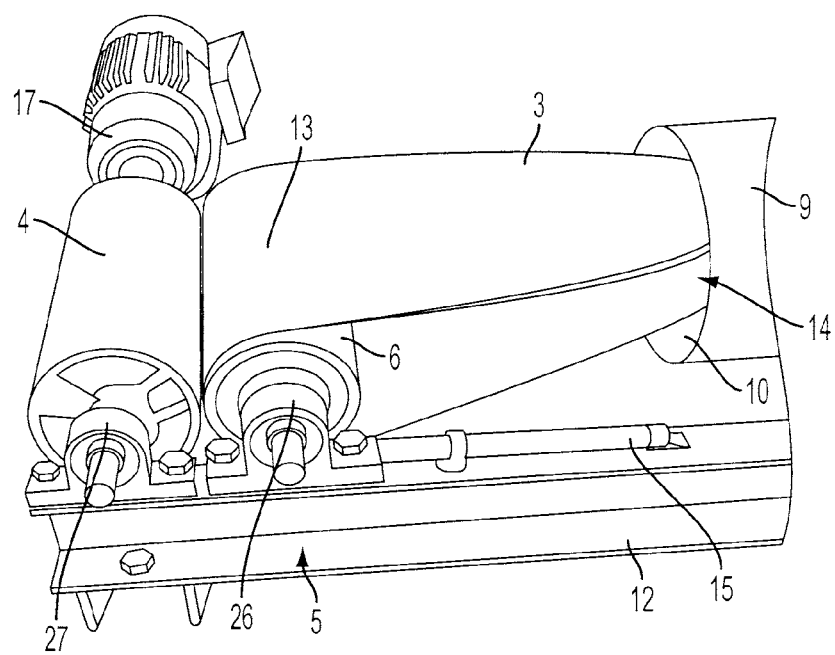
FIG. 3 is a perspective view of the in-feed end of the conveying apparatus with a belt grinder mounted.
Figure 4:
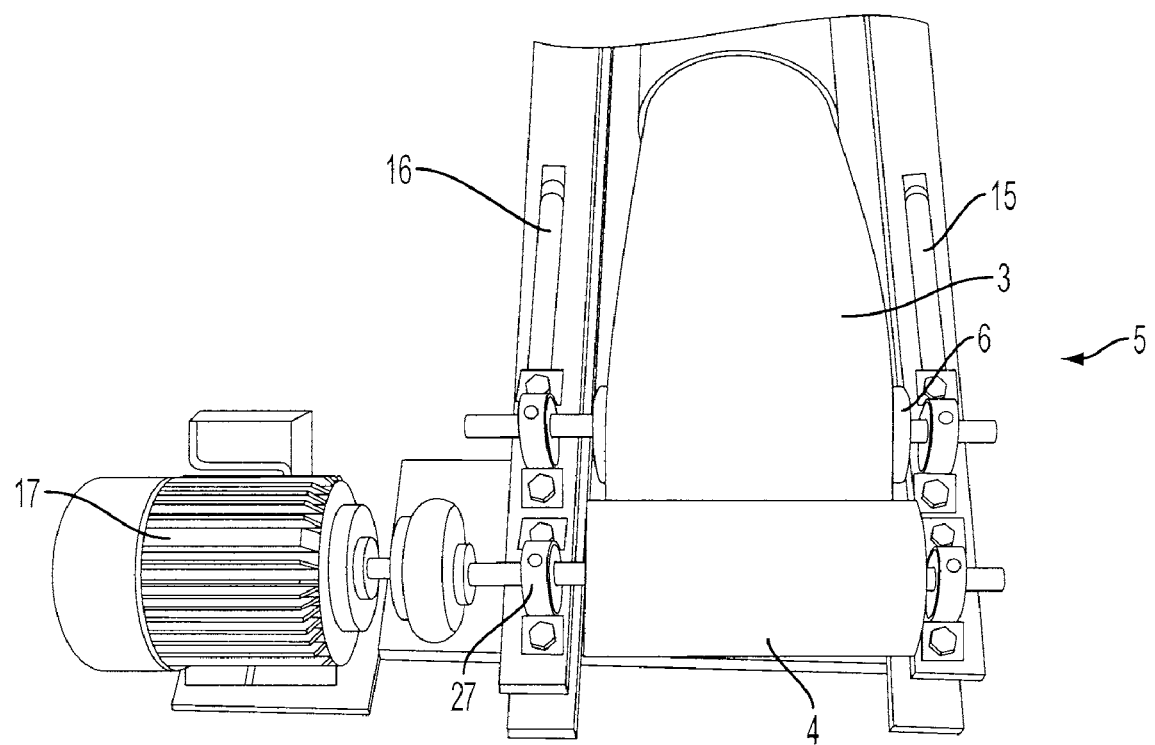
FIG. 4 is an end-on perspective view of the in-feed end of a conveying apparatus with a belt grinder mounted.

The improved conveying apparatus for a plant for recovery of diamond, other precious and semi-precious stones and minerals, has an endless conveyor with both its feed and return portions enclosed in a pipe. FIG. 1 shows at one end 1 a drive roller 2 for driving the belt 3 and FIG. 4 shows at the other end 5 an idler roller 6, with the feed portion 7 of the belt above the return portion 8 and the feed portion cupped by the pipe 9. FIGS. 1 and 4 show the edges 10 of the delivery and feed portions of the belt respectively being lifted up so that the belt assumes a trough shape, i.e. cupped; the belt is cupped by the pipe all along the length of the pipe. The drive roller and the idler roller are located at elevated positions by being mounted on top of the beams 11 and 12 respectively; the feed portion of the belt at the top 13 of the idler roller is located above the level 14 of the diameter of the pipe. It is found that surprisingly the drag on the belt is negligible, for example a mere 4 amps drain on a 1.2 Kw. Varying lengths can be used, e.g. from 6 m to 12 m long, according to application.

FIG. 4 shows how the belt surface is ground to an accurate thickness dimension in situ on the apparatus; a grinding roller 4 is mounted adjacent the idler roller, which is adjusted to a required position by screw adjustments 15 and 16 and rotated by the motor 17 in the opposite direction to the rotation of the idler roller, so as to grind off high spots of the belt as the belt is driven. Once the belt is accurate the grinding roller is removed.

Figure 5:
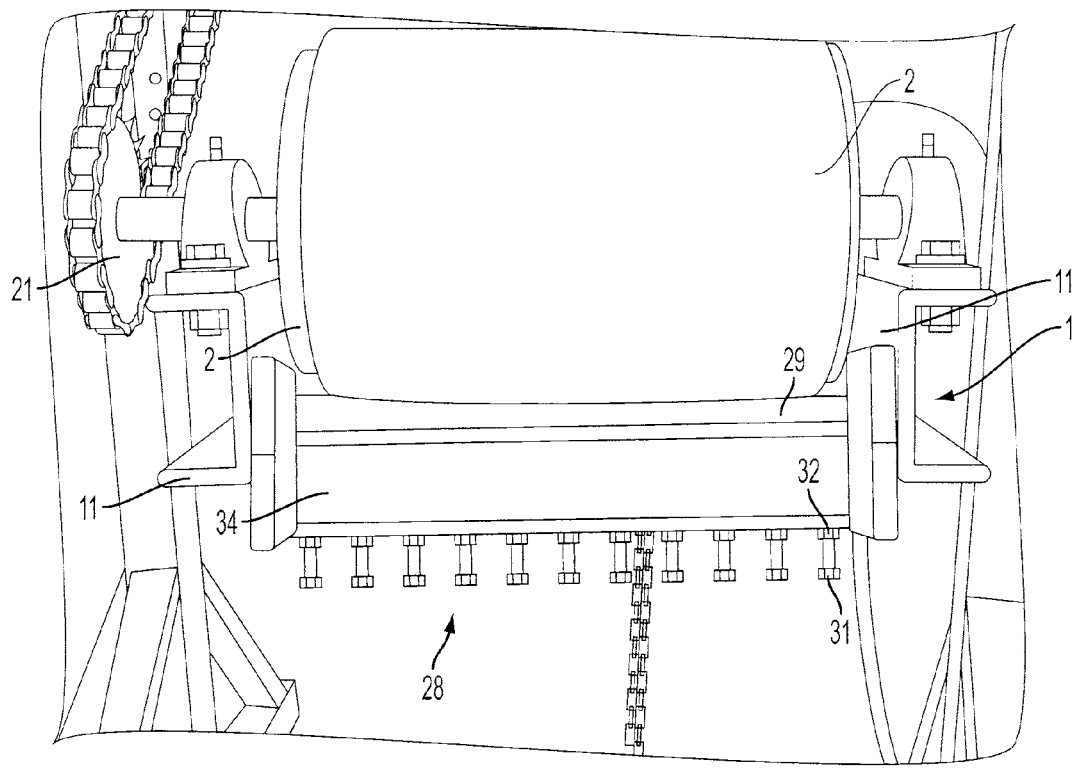
FIG. 5 is a perspective view of the delivery end of a conveying apparatus, showing the belt scraper.
Figure 6:
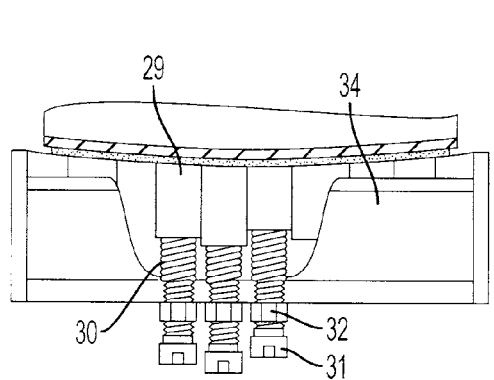
FIG. 6 is an end view of the scraper, partially sectioned.
Figure 7:
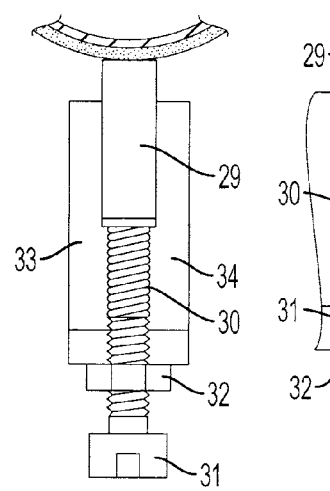
FIG. 7 is a side sectional view of the scraper.
Figure 8:
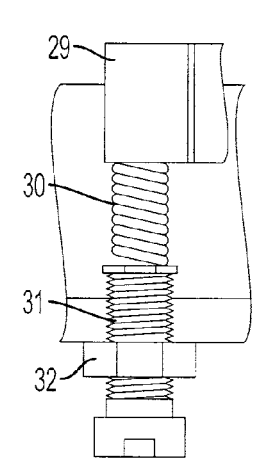
FIG. 8 is an enlarged view of a part of the scraper.

The driving roller is made with a convex profile or camber as is seen in the views if FIGS. 5 and 6, to ensure self-centering of the tracking of the belt on the roller, after the idler roller has been set up orthogonal to the belt direction.

The drive roller is driven by a chain 18 from a motor 19, running on sprockets 20 and 21. The motor and driving roller are mounted on the pipe by means of transverse cradles extending between the two beams 11 and secured by straps or hoop clamps 22, with a pedestal 23 for the motor, incorporating a chain tensioning platform 24. Beams 12 are mounted in similar way with cradles and straps 25 to the other end of the pipe and carry the idler roller in plummer blocks 26 with screw adjustments 15 and 16; the grinding roller is also mounted on the beams, on plummer blocks 27.

The views of FIGS. 5 to 8 show that the apparatus has a belt scraper 28 added to it. The belt scraper has multiple contiguous scraping elements 29, each spring loaded by a spring 30 and adjustable by screw 31 and lock nut 32. Each scraper element is made of "VESCONITE" (trade mark, a low friction polymer) which wears well to the shape of the belt, each being initially adjusted to the convex shape of the rubberised driving roller. The scraper elements are held between the plates 33 and 34, which are bolted to the beams.

Figure 9:
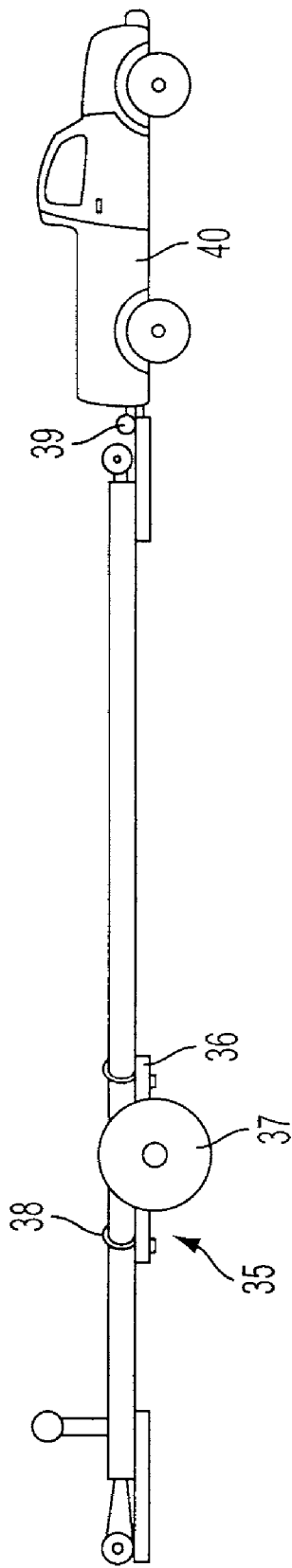
FIGS. 9 and 10 are an elevation and plan view respectively of a means of transport of the apparatus.
Figure 10:
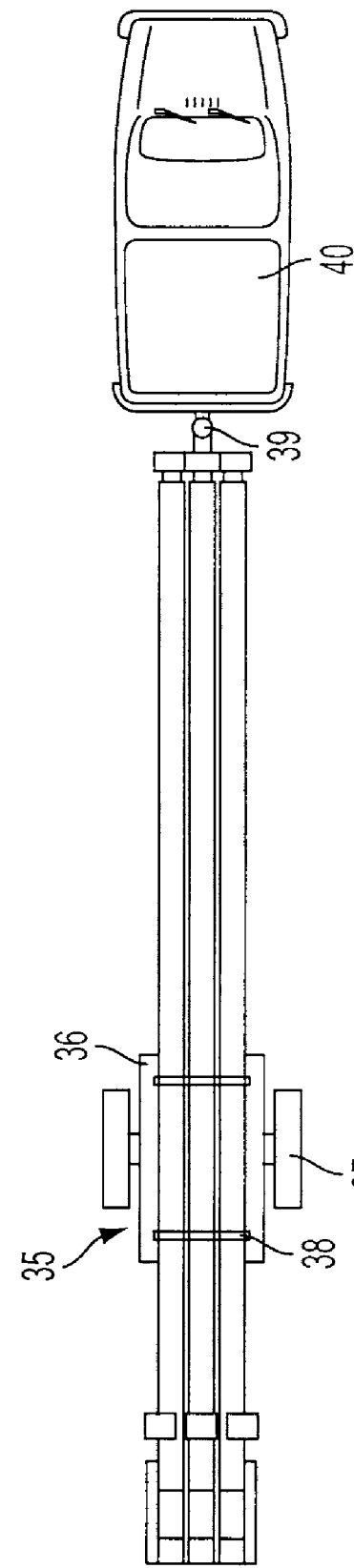

FIGS. 9 and 10 show a dolly 35 consisting of a frame 36 and road wheels 37 with clamps 38 for clamping to one or more pipes of the apparatus, together with a tow hitch 39 also clamped to the pipes, for towing them behind a tow vehicle 40. For example, apparatus comprising pipes up to 9 or 12 meters can be transported in this way, in suitable circumstances.

A feeder trough can be added to the plant, adapted for conveying (e.g. diamondiferous gravel) to the feed end of the conveyor, i.e. at the return idler end.

A delivery chute can be provided as well, and other components as may be required or desired for various applications.

FIGS. 1 to 10 show use of an electric motor 19 with a chain drive to the driven pulley, but an improved drive has been sourced in the form of a motorized roller, that is the drive roller has an electric motor and gearing inside it. In addition an electronic controller has been added, which provides control from a computer screen of speed, provides a soft start and allows monitoring current drawn etc.

Figure 11:
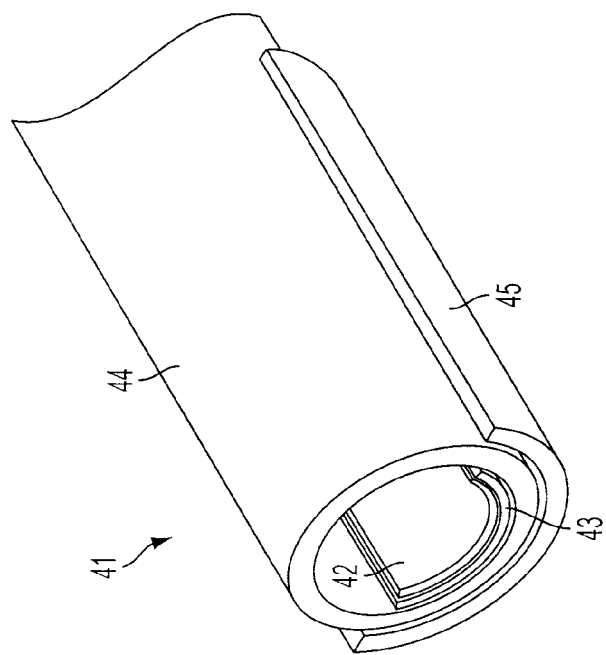
FIG. 11 is a perspective view of a partial length of the conveying apparatus.
Figure 12:
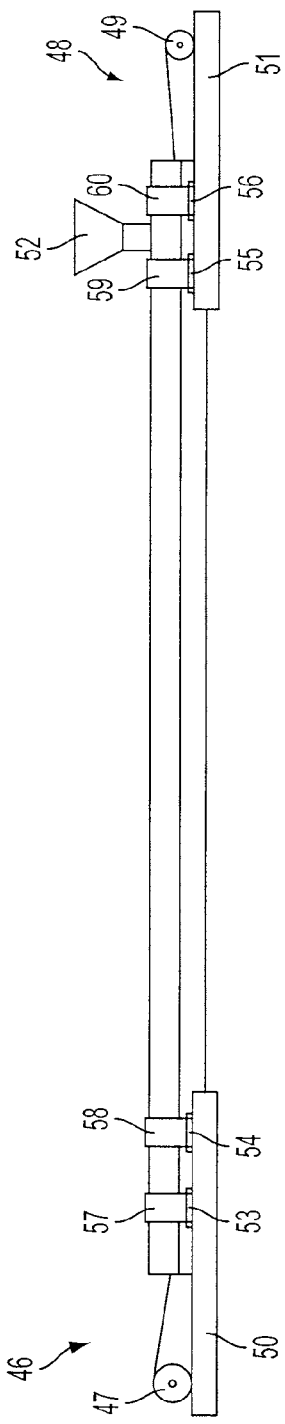
FIG. 12 is a side view of the conveying apparatus.

Referring to FIGS. 11 and 12 of the drawings, the improved conveying apparatus 41 for a plant for recovery of diamond, other precious and semi-precious stones and minerals, or transport of any material, like loading sawdust onto a ship, for example, has an endless conveyor with both its feed portion 42 and return portion 43 enclosed in a plastic pipe 44. The plastic pipe is supported by a steel hemi-pipe 45 which cradles the plastic pipe. FIG. 12 shows at one end 46 a drive roller 47 for driving the belt 42-43 and at the other end 48 an idler roller 49, with the feed portion 42 of the belt above the return portion 43 and the feed portion cupped by the pipe 44. Further, as seen in FIG. 11, the feed portion 42 contacts and slides on the return portion 43. The drive roller is a motorised roller with an electric drive motor located inside the roller. The drive roller and the idler roller are mounted on top of the beams 50 and 51 respectively. Feed of material is provided by the funnel 52.

The beams 50 and 51 are mounted on the pipe by means of transverse cradles 53, 54, 55 and 56 extending between the beams and secured by straps or hoop clamps 57, 58, 59 and 60.

Referring to FIG. 13, there is shown a conveyor according to the invention which is adapted for drying of the material being conveyed. The conveyor pipe 41 described with reference to FIGS. 11 and 12, being a plastic pipe supported by a half-round steel pipe, with drive and idler rollers and feeder bin, the same reference numerals are used to indicate these parts and the description above of them is referred to; the feed portion of the conveyor is shown at 42 and the return portion at 43. In this example a sponge rubber cushion 61 is inserted in the pipe to stop material rolling back. FIG. 14 shows the part of the feeder bin that extends into the pipe, this has an inverted U-shaped opening 62 at the lower end facing along the length of the pipe. The effect of this is that if the belt stops the feed simply backs up the bin and stops also, once the belt moves the feed resumes and the rate of the feed is determined by selection of the size of the opening 62.

The pipe has an air intake at 63, driven by a fan (not shown) in the intake, which is directed into the pipe; the air may be heated by heating means if desired or required; however, in hot sunny conditions if the plastic pipe is black, solar heat is sufficient in many cases to dry the material to the required moisture content, for example less than 4%. An air extractor 64 also driven by a fan is located near the other end of the pipe conveyor. The pipe has a number of deflectors 65 mounted inside the pipe, turned this way and that so as to turn over the material on the belt as it passes up the pipe towards the delivery end at the drive roller 47.

Two guide roll sets 66,67 and 68,69 are provided at each of the two ends of the pipe, where the belt exits and enters the pipe, positioned so as to guide the edges of the belt so that they do not abrade the ends of the pipe. The roll sets are mounted on the pipe ends with axes of rotation upright (that is, at ninety degrees to the axes of rotation of the drive and idler rollers, which are horizontal). Each roll set comprises two rolls that are positioned to roll against the edges of the feed and return portions of the belt respectively. In the view of FIG. 13 the roll set 66 and the roll set 68 are seen, bearing on the near-side edges of the belt, the roll sets 67 and 69 are directly behind, obscured by the roll sets 66 and 68 respectively and bearing on the far-side edges of the belt, in this view.

What is claimed is:

1. A conveying apparatus, comprising an endless conveyor belt loop with both a feed portion and a return portion enclosed in a single pipe, with a drive roller at a first end of the pipe for driving the belt and with an idler roller at a second end of the pipe, with the feed portion above the return portion, contacting and sliding on the return portion, both portions inside the single pipe, and at least the feed portion cupped by the pipe.

2. A conveying apparatus as claimed in claim 1, in which the drive roller and the idler roller cup the belt at least at the feed portion by being positioned at elevated positions selected so that the feed portion of the belt at the top of the roller is located above the level of the diameter of the pipe.

3. A conveying apparatus as claimed in claim 1, in which the pipe is made of a plastic material or other material of low coefficient of friction, the pipe supported by lying in a semi-pipe or trough of steel that extends along the full length of the plastic pipe.

4. A conveying apparatus as claimed in claim 3, in which the semi-pipe of steel is a hemi-pipe, that is one half of a pipe slit along its length on its diameter.

5. A conveying apparatus as claimed in claim 1, which is adapted for drying of the material being conveyed, by means of an air intake, driven by a fan in the intake, directing drying air into the pipe and an air extractor with a fan is located near the other end of the pipe conveyor, and the pipe having a number of deflectors mounted inside the pipe, so as the turn over the material on the belt as it passes up the pipe towards the delivery end.

6. A process of providing a conveying apparatus comprising the steps of:

passing a pre-fabricated conveyor belt loop, including both a feed portion and a return portion, through a single pipe, such that within the single pipe the feed portion is above the return portion, the feed portion contacts and slides on the return portion and at least the feed portion cupped by the pipe; and bolting or fixing a drive roller and an idler roller at opposite ends of the pipe with the belt looped over the rollers.

7. A process as claimed in claim 6, in which a belt grinding roller is mounted at one end of the pipe, the belt is driven and the grinding roller is driven to grind the belt smooth, and the pipe is a plastic pipe and is fitted in a semi-pipe of steel so as to be supported by the semi-pipe under it.

8. A process of providing a conveying apparatus as claimed in claim 6, which includes the steps of pre-manufacturing the belt as a belt loop in a factory to a required length, with a high quality vulcanized joint or splice and inserting the belt loop into the pipe, able to be removed for replacement by simply pulling the belt loop out of the pipe.

9. A process of providing a conveying apparatus as claimed in claim 8, which includes the steps of pre-manufacturing spare factory made belts and supplying them along with the conveying apparatus and keeping them on site and making quick replacement in the case of belt failure.

* * * * *